US007292306B2

(12) United States Patent
Hwang

(10) Patent No.: US 7,292,306 B2
(45) Date of Patent: Nov. 6, 2007

(54) APPARATUS FOR DISPENSING SEALANT, METHOD OF MANUFACTURING A LIQUID CRYSTAL DISPLAY DEVICE USING THE SAME, AND LIQUID CRYSTAL DISPLAY DEVICE MANUFACTURED BY THE SAME

(75) Inventor: Yeong Geun Hwang, Paju-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 23 days.

(21) Appl. No.: 11/321,080

(22) Filed: Dec. 30, 2005

(65) Prior Publication Data

US 2006/0285065 A1 Dec. 21, 2006

(30) Foreign Application Priority Data

Jun. 20, 2005 (KR) ............... 10-2005-0053147

(51) Int. Cl.
*G02F 1/1339* (2006.01)
(52) U.S. Cl. .................... 349/190; 349/153
(58) Field of Classification Search ........ 349/190, 349/187, 153
See application file for complete search history.

(56) References Cited

U.S. PATENT DOCUMENTS

| 6,791,660 B1 * | 9/2004 | Hayashi et al. ........ 349/190 |
| 7,061,560 B2 * | 6/2006 | Cheng et al. .......... 349/111 |
| 2004/0090589 A1 * | 5/2004 | Jung et al. ............ 349/187 |
| 2006/0139563 A1 * | 6/2006 | Momose et al. ........ 349/190 |

* cited by examiner

*Primary Examiner*—David Nelms
*Assistant Examiner*—David Y. Chung
(74) *Attorney, Agent, or Firm*—McKenna Long & Aldridge LLP

(57) ABSTRACT

A method for forming an LCD device, a sealant dispensing apparatus and an LCD device manufactured by the sealant dispensing apparatus. The method includes preparing lower and upper substrates; dispensing liquid crystal on any one of the lower and upper substrates; forming a main sealant having no inlet on any one of the lower and upper substrates; forming an auxiliary sealant in the periphery of the main sealant on any one of the lower and upper substrates; and bonding the lower and upper substrates to each other; wherein the main and auxiliary sealants are formed at the same time. The sealant dispensing apparatus includes a syringe having main and auxiliary nozzles for discharging sealant. The auxiliary nozzle rotates revolves around the main nozzle. The spacing between the main nozzle and the auxiliary nozzle may be controlled to control the interval between the auxiliary and the main sealants.

5 Claims, 12 Drawing Sheets

APPARATUS FOR DISPENSING SEALANT, METHOD OF MANUFACTURING A LIQUID CRYSTAL DISPLAY DEVICE USING THE SAME, AND LIQUID CRYSTAL DISPLAY DEVICE MANUFACTURED BY THE SAME

This application claims the benefit of the Korean Patent Application No. P2005-0053147, filed on Jun. 20, 2005, which is hereby incorporated by reference as if fully set forth herein.

BACKGROUND OF THE INVENTION

1. Field of the Invention

The present invention relates to a liquid crystal display (LCD) device, and more particularly, to a sealant of an LCD device formed by a liquid crystal dispensing method.

2. Discussion of the Related Art

Among various ultra-thin flat type display devices, which include display screens having a thickness of several centimeters, the liquid crystal display (LCD) device has received great attention because it is suitable for low operation voltage and has low power consumption. These qualities make the LCD device is suitable for a portable applications. LCD devices are widely used in appliances such as notebook computers and monitors, and are employed in environments such as spacecraft and aircraft.

Generally, an LCD device comprises a lower substrate, an upper substrate, and a liquid crystal layer. The lower substrate includes a thin film transistor and a pixel electrode. The upper substrate includes a black matrix layer, a color filter layer, and a common electrode. The liquid crystal layer is formed between the lower substrate and the upper substrate. In operation, the liquid crystal layer is driven by an electric field formed between the pixel electrode and the common electrode. The electric field controls the light transmittance of the driven liquid crystal layer thereby displaying images.

A liquid crystal injection method of the related art for forming the liquid crystal layer of an LCD device uses a pressure differential and capillary phenomenon to form the liquid crystal layer of an LCD device. The related art liquid crystal injection method will be described as follows.

First, lower and upper substrates are manufactured.

Next, a sealant having an inlet is formed on any one of the lower and upper substrates. The sealant bonds the two substrates to each other. After bonding the two substrates to each other, the sealant is hardened forming bonded substrates.

The bonded substrates are positioned in a vacuum chamber, and the vacuum chamber is evacuated to achieve a vacuum state. While the vacuum state is maintained within the chamber, the bonded substrates are dipped into liquid crystal. The vacuum state of the vacuum chamber creates a vacuum state within the bonded substrates. The vacuum state within the bonded substrates causes the liquid crystal to be injected within the bonded substrates through the inlet through capillary phenomenon. As a result, a liquid crystal layer is formed between the two substrates.

However, as the display area of the LCD device increases in size, the liquid crystal injection method requires longer process times to produce the liquid crystal layer, thereby lowering the productivity.

To overcome this problem of the liquid crystal injection method, a liquid crystal dispensing method has been developed. The liquid crystal dispensing method is described with reference to FIGS. 1A, 1B and 1C.

First, as shown in FIG. 1A, a lower substrate 1 and an upper substrate 3 are prepared.

Referring next to FIG. 1B, a sealant 7 having no inlet is formed on the lower substrate 1, and then liquid crystal 5 is dispensed onto the lower substrate 1, thereby forming a liquid crystal layer.

As shown in FIG. 1C, after bonding the lower substrate 1 and the upper substrate 3 to each other, the sealant 7 is hardened to complete an LCD device.

In the liquid crystal dispensing method described with above with reference to FIGS. 1A, 1B, and 1C, liquid crystal is directly dispensed onto the substrate. The direct dispensing method can decrease the process time for forming the liquid crystal layer compared to liquid crystal injection methods because the lengthy process for injecting liquid crystal is avoided.

However, the related art liquid crystal dispensing method has the following disadvantages.

In the liquid crystal dispensing method of the related art, since the sealant 7 has no inlet, the sealant pattern may be changed due to external pressure applied when performing a bonding process.

In case of the liquid crystal injection method, the sealant pattern has an inlet. Thus, even though the external pressure is applied to the substrates on performing a bonding process, it is possible to decrease the impact of external pressure. However, since the liquid crystal dispensing method of the related art uses a sealant having no inlet, the sealant pattern may be deformed when performing the bonding process.

SUMMARY OF THE INVENTION

Accordingly, the present invention is directed to an apparatus for dispensing sealant; a method of manufacturing liquid crystal display device using the same; and liquid crystal display device manufactured by the same that substantially obviates one or more problems due to limitations and disadvantages of the related art.

An advantage of the present invention is to provide a method for manufacturing an LCD device, in which a sealant pattern is not deformed when performing a bonding process.

Another advantage of the present invention is to provide an apparatus for dispensing a sealant for an LCD device.

Another advantage of the present invention is to provide an LCD device manufactured with a sealant dispensing apparatus.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method for manufacturing an LCD device includes preparing lower and upper substrates; dispensing liquid crystal on any one of the lower and upper substrates; forming a main sealant having no inlet on any one of the lower and upper substrates; forming an auxiliary sealant in the periphery of the main sealant on any one of the lower and upper substrates; and bonding the lower and upper substrates to each other, wherein the main and auxiliary sealants are formed at the same time.

In the above method, the auxiliary sealant is formed in the periphery of the main sealant. Thus, even though an external pressure is applied to the sealants during the bonding process, it is possible to minimize the deformation of sealant pattern. The main sealant is provided to bond the lower and upper substrates to each other, while the auxiliary sealant is provided to protect the main sealant. The auxiliary sealant may be removed in a cell cutting process after performing the bonding process.

The main and auxiliary sealants are formed at the same time, avoiding an additional process for forming the auxiliary sealant and decreases the process time.

When forming the main and auxiliary sealants, each of the sealants may have a predetermined gap which is connected or closed during the bonding process.

The main and auxiliary sealants are formed using a sealant dispensing apparatus including a main nozzle and an auxiliary nozzle.

In another aspect of the present invention, the sealant dispensing apparatus includes a syringe for holding a sealant and main and auxiliary nozzles connected with the syringe, for discharging the sealant to the outside of the syringe, wherein the auxiliary nozzle revolves around the main nozzle.

In the above described sealant dispensing apparatus, the main and auxiliary nozzles are connected to the syringe for forming the main and auxiliary sealants at the same time. The auxiliary nozzle revolves around the main nozzle, whereby the auxiliary sealant is formed in the periphery of the main sealant.

Also, it is possible to control an interval between the main nozzle and the auxiliary nozzle, thereby controlling an interval between the main sealant and the auxiliary sealant.

In another aspect of the present invention, an LCD device includes lower and upper substrates; a main sealant having no inlet, formed between the lower and upper substrates; an auxiliary sealant formed in the periphery of the main sealant; and a liquid crystal layer inside the main sealant, wherein the main sealant is formed in an enclosing shape such as square, and the auxiliary sealant is also formed in an enclosing shape. The auxiliary sealant may be formed in an enclosing shape having rounded corners. For example when the main sealant has a square or rectangular shape, the shape of the auxiliary sealant may be a square or rectangle having rounded corners.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, a method for manufacturing an LCD device according to an embodiment of the present invention will be described with reference to the accompanying drawings.

Figure 1A:
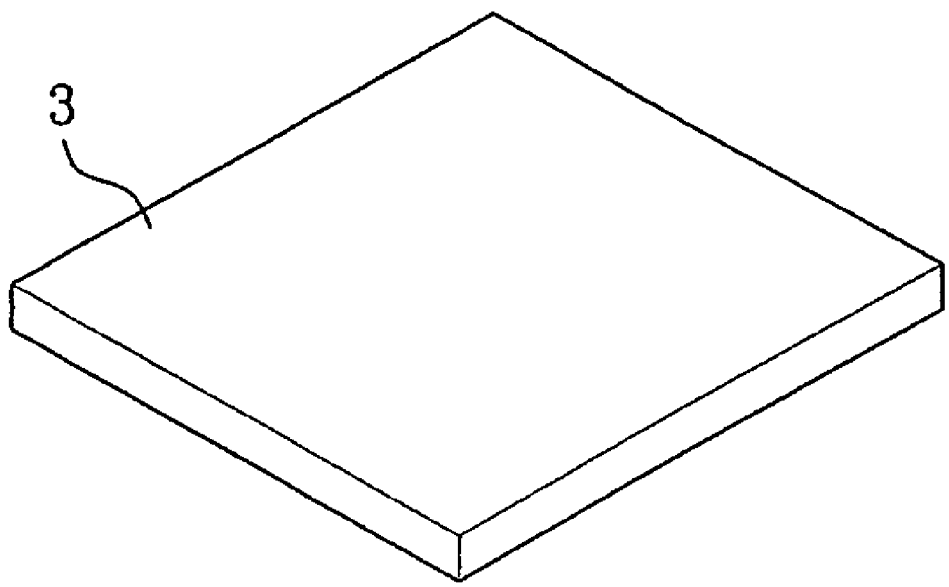
FIGS. 1A, 1B, and 1C are perspective views showing a process for manufacturing an LCD device in a liquid crystal dispensing method according to the related art.
Figure 1B:
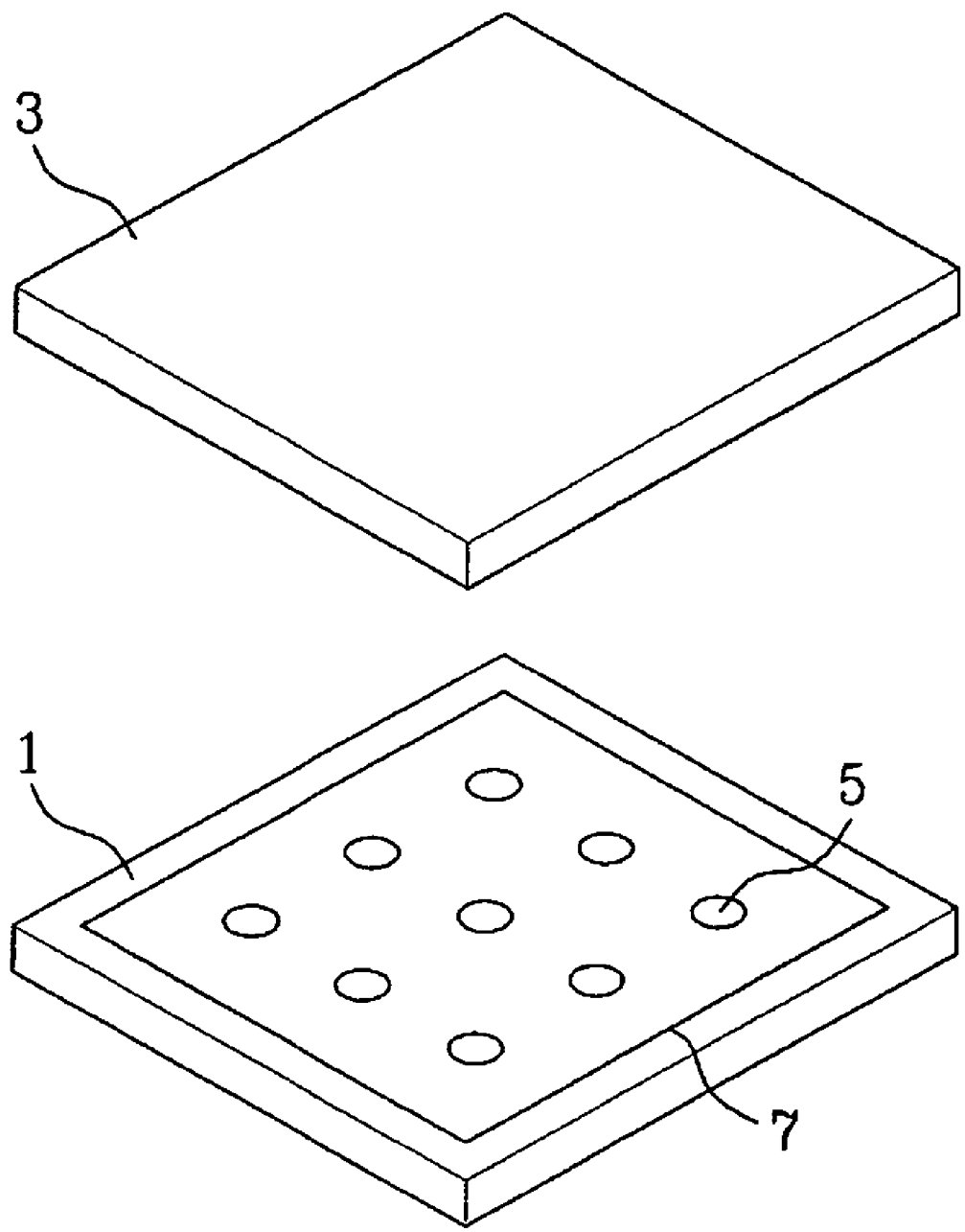
Figure 1C:
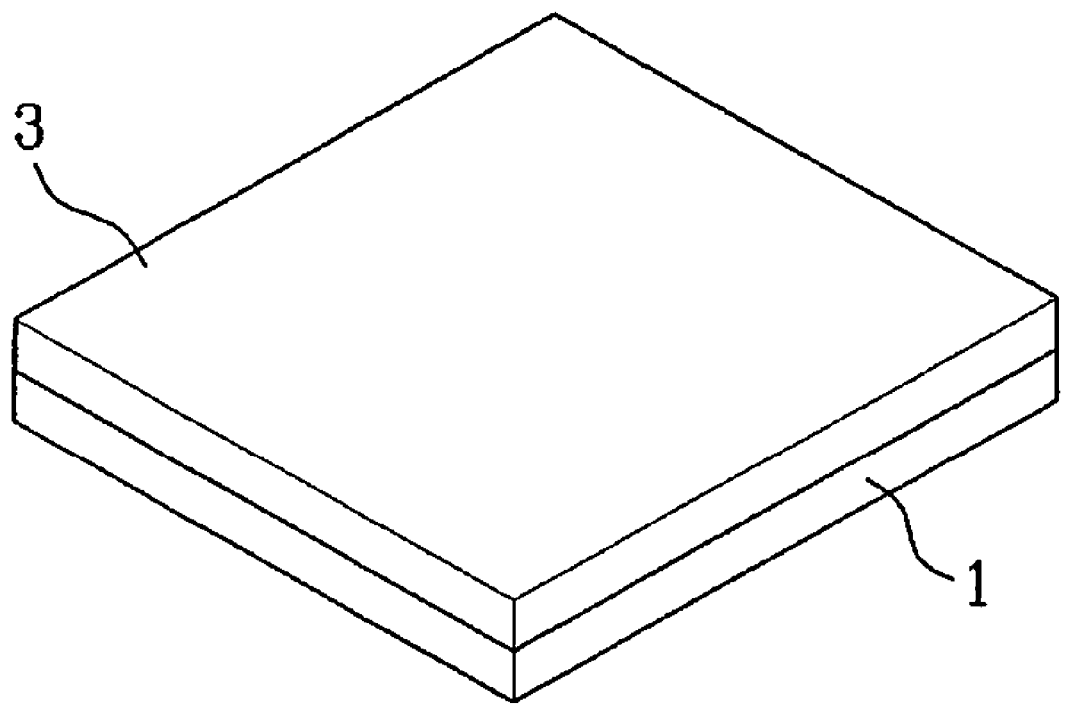
Figure 2A:
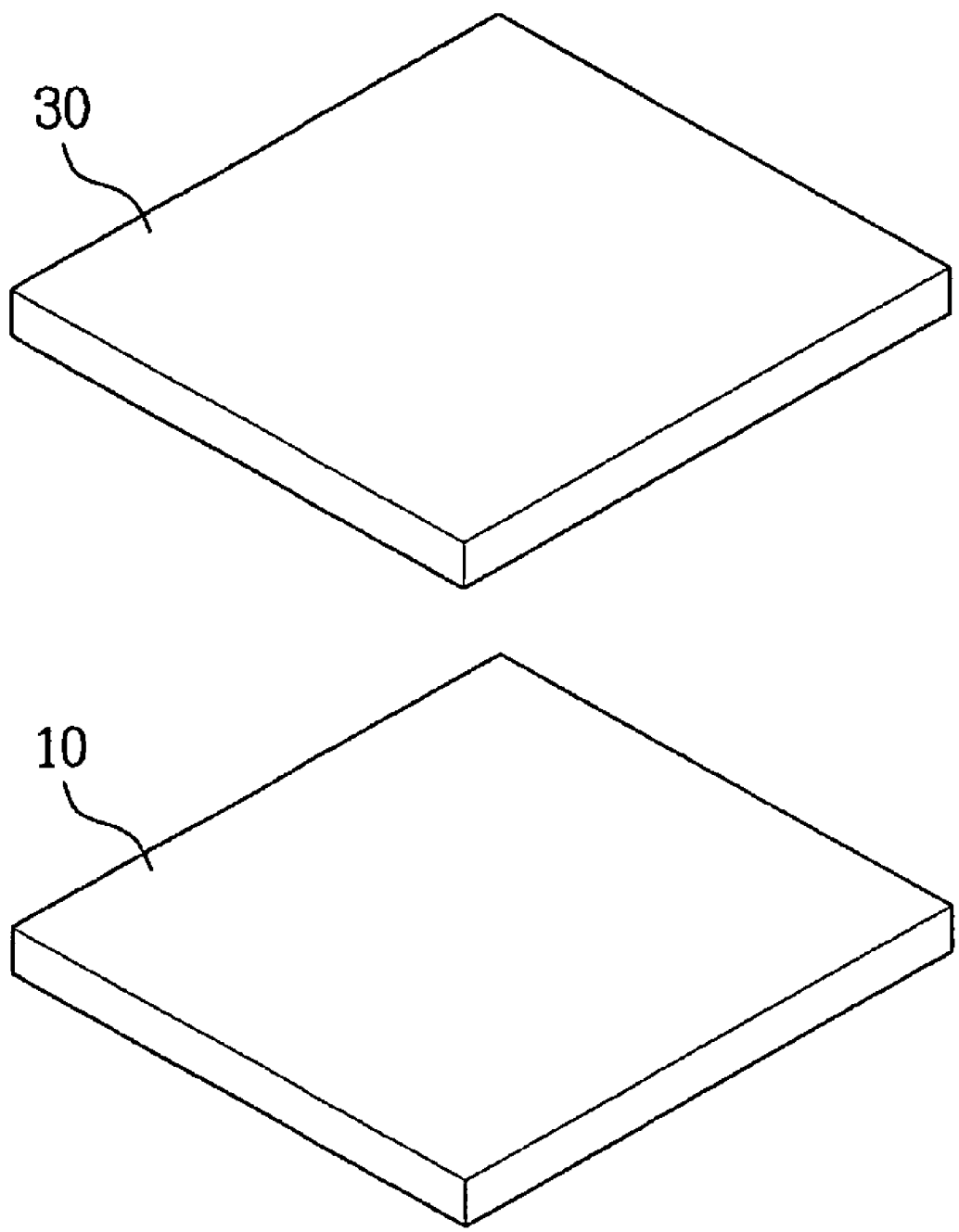
FIGS. 2A, 2B, and 2C are perspective views showing a process for manufacturing an LCD device according to an embodiment of the present invention.
Figure 2B:
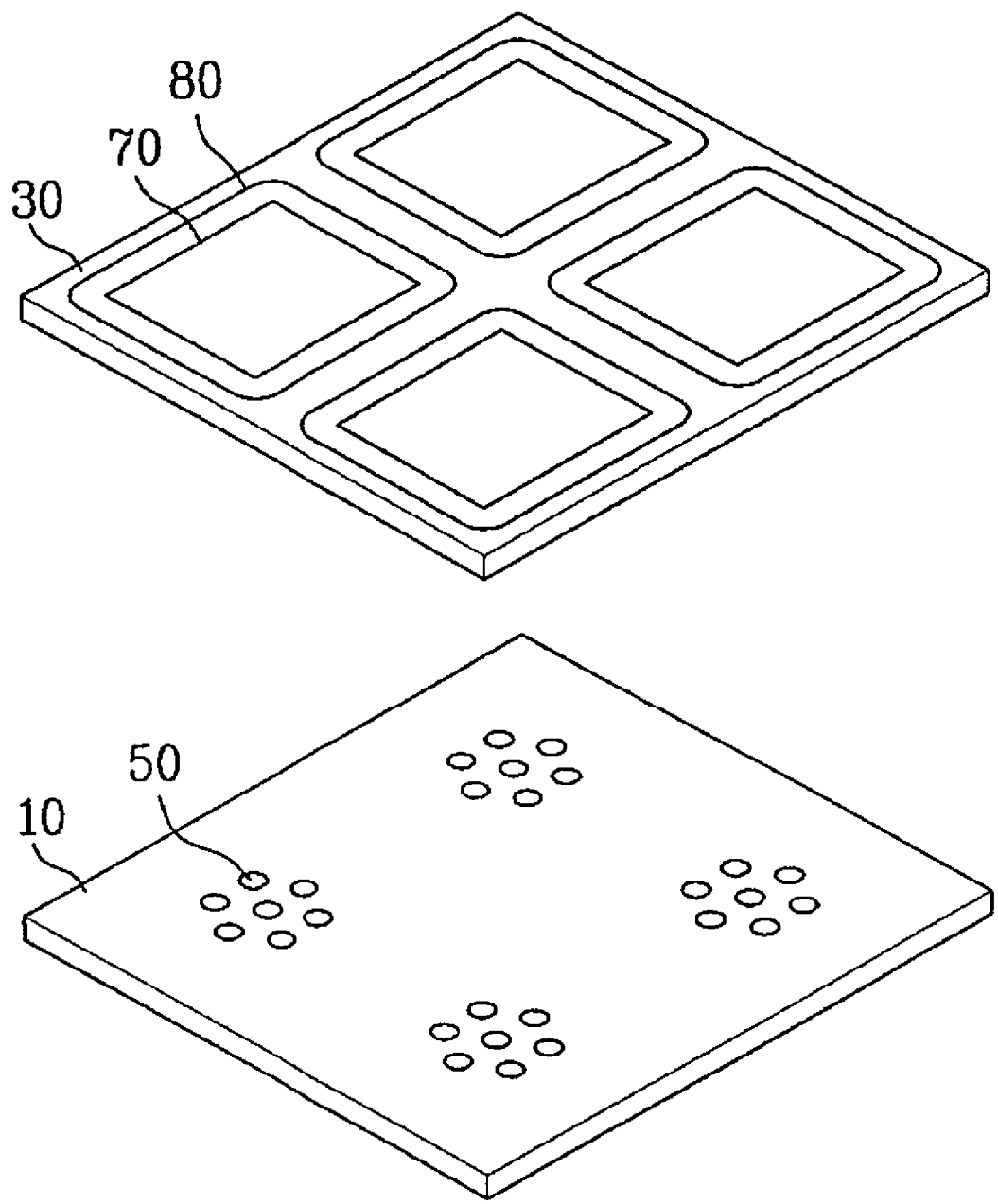
Figure 2C:
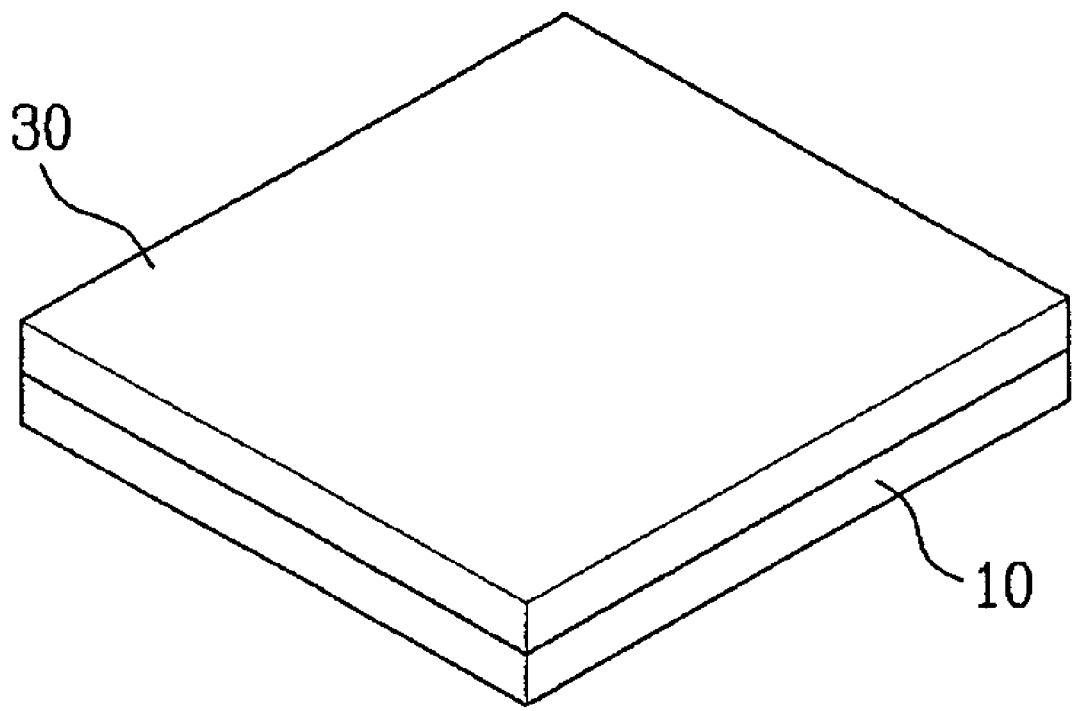

FIGS. 2A to 2C are perspective views showing a process for manufacturing an LCD device according to one embodiment of the present invention.

First, as shown in FIG. 2A, a lower substrate 10 and an upper substrate 30 are prepared.

A plurality of gate and data lines are formed on the lower substrate 10, wherein the gate lines are formed in perpendicular to the data lines, thereby defining a plurality of pixel regions. A plurality of thin film transistors are formed at intersections of the gate and data lines. Each of the thin film transistors comprises a gate electrode, a semiconductor layer, a source electrode, and a drain electrode. Also, a pixel electrode is formed in the unit pixel region, wherein the pixel electrode is electrically connected with the thin film transistor.

The upper substrate 30 includes a black matrix layer, an RGB color filter layer, and a common electrode. The black matrix layer prevents light from leaking in the portions corresponding to the gate line, the data line, and the thin film transistor. The RGB color filter layer is formed on the black matrix layer, and the common electrode is formed on the RGB color filter layer.

In case of an IPS (In-Plane Switching) mode LCD device, the common electrode is formed not on the upper substrate but on the lower substrate. More particularly, the common electrode is formed in parallel to the pixel electrode, whereby a transverse electric field may be induced between the pixel electrode and the common electrode. An overcoat layer is formed on the RGB color filter layer of the upper substrate.

In addition, an alignment layer is formed on at least any one of the lower substrate 10 and the upper substrate 30, wherein the alignment layer is provided for initial alignment of liquid crystal.

The alignment layer may be formed of a polymer such as polyamide, polyimide compound, PVA (Polyvinyl Alcohol) or polyamic acid, or may be formed of a photosensitive material such as PVCN (Polyvinyl Cinnamate), PSCN (Polysiloxane Cinnamate) or CelCN (Cellulose Cinnamate)-based compounds.

As shown in FIG. 2B, after the alignment layer has been formed, liquid crystal 50 is dispensed on the lower substrate 10. A main sealant 70 and an auxiliary sealant 80 are formed on the upper substrate 30, with the main sealant 70 and the auxiliary sealant 80 being formed at the same time.

In FIG. 2B, four unit cells are shown. However, the number of unit cells may vary with the size of the substrate. Also, the unit cells may be uniform in size or may be of different sizes.

The liquid crystal 50 may be dispensed onto the center of the unit cell. During the bonding process and before the main sealant and auxiliary sealant 70 and 80 harden, the liquid crystal 50 may be contaminated by the main and auxiliary sealants 70 and 80. Dispensing the liquid crystal 50 onto the center of the unit cell reduces the possibility of contamination by the main and auxiliary sealants 70 and 80, because the dispensed liquid crystal 50 does not make substantial contact with the main or auxiliary sealants 70 and 80 prior to hardening or curing. The dispensed liquid crystal 50 spreads out even after hardening of the main and auxiliary sealants 70 and 80, so that the liquid crystal is dispensed at a uniform density on the entire surface of the substrate.

The main and auxiliary sealants 70 and 80 are formed in closed patterns having no inlet. The main and auxiliary sealants 70 and 80 may be formed in a screen printing method or a dispensing method. In the screen printing method, a screen is in contact with the substrate, whereby components formed on the substrate may be damaged. Also, if applying the screen printing method to the large-sized substrate, the loss of sealant increases, making the screen printing method uneconomical. Thus the dispensing method may be advantageous compared to using the screen printing method when forming large-sized substrates.

When forming the main and auxiliary sealants 70 and 80 by the dispensing method, a dispensing apparatus including a main nozzle for forming the main sealant 70 and an auxiliary nozzle for forming the auxiliary sealant 80 may be used. A dispensing method using the dispensing apparatus including a main nozzle and an auxiliary nozzle will be illustrated hereinafter.

FIG. 2B shows the main and auxiliary sealants 70 which are simultaneously formed with the dispensing apparatus including the main and auxiliary nozzles. The main sealant 70 may be formed in the shape of square using the dispensing apparatus including main and auxiliary nozzles, and the auxiliary sealant 80 may be formed in shape of square having four rounded corners. While the main sealant and the auxiliary sealant are shown as having square shapes the main sealant and the auxiliary sealants may have other enclosing shapes.

If the main and auxiliary sealants 70 and 80 are formed using the screening printing method, both the main and auxiliary sealants 70 and 80 may be formed in similar shapes. For example the main sealant 70 and the auxiliary sealant 80 may have similar square or rectangular shapes.

The main and auxiliary sealants 70 and 80 may have the same line width or may have different line widths. The auxiliary sealant 80 may be removed in a cell-cutting process. If the line width of the auxiliary sealant 80 is too large, it may be difficult to remove the auxiliary sealant in the cell-cutting process. The line width of the auxiliary sealant 80 may be smaller than the line width of the main sealant 70.

The main and auxiliary sealants 70 and 80 may be formed of UV-hardening type sealants. At this time, a polymer having both ends coupled to acrylic group mixed with an initiator may be used as the UV-hardening type sealant. A polymer having one end coupled to acrylic group and the other end coupled to epoxy group mixed with an initiator may be used as the UV-hardening type sealant.

In the drawings, the liquid crystal 50 is shown dispensed onto the lower substrate 10, and the main and auxiliary sealants 70 and 80 are formed on the upper substrate 30. The liquid crystal 50 may be dispensed on the upper substrate 30, and the main and auxiliary sealants 70 and 80 may be formed on the lower substrate 10. Also, the liquid crystal 50 and the main and auxiliary sealants 70 and 80 may be formed on the same substrate.

If the liquid crystal 50 and the main and auxiliary sealants 70 and 80 are formed on the same substrate, an imbalance is caused between one substrate having the liquid crystal 50 and the main and auxiliary sealants 70 and 80 and the other substrate, thereby requiring a long process time. In addition, even though the sealant is contaminated before the bonding process, it is impossible to clean the substrate. Forming the sealant and the liquid crystal on different substrates reduces or eliminates these problems.

Spacers may be formed on any one of the lower and upper substrates. The spacers may be formed on the upper substrate 30 for maintenance of a cell gap. The spacers may be formed of ball spacers or column spacers. Forming ball spacers in large-sized panels may create produce a non-uniform cell gap.

The column spacers may be formed of photosensitive organic resin, and are formed in correspondence with the black matrix layer.

As shown in FIG. 2C, following the forming of the auxiliary and main sealants the lower and upper substrate 10 and 30 are bonded to each other.

First, the upper substrate 30 is positioned over the lower substrate 10 on which the liquid crystal 50 has been dispensed. The surface of the upper substrate 30, on which the layers are formed, faces the lower substrate 10.

After bonding the substrates to each other, a process for hardening the main and auxiliary sealants 70 and 80 is additionally performed. If using the UV-hardening type sealant, the main and auxiliary sealants 70 and 80 are hardened by performing a UV-irradiation process or by performing both a UV-irradiation and a heating processes.

Applying UV radiation to the entire surface of the substrate, may cause bad effects on the components such as thin film transistors of the substrate. For example, a pretilt angle of the alignment layer may be changed. Accordingly, when applying UV rays, a mask for covering the portions other than the main and auxiliary sealants 70 and 80 may be provided.

A cell-cutting process may be performed after performing the bonding process. The cell-cutting process may remove the auxiliary sealant 80.

Figure 3A:
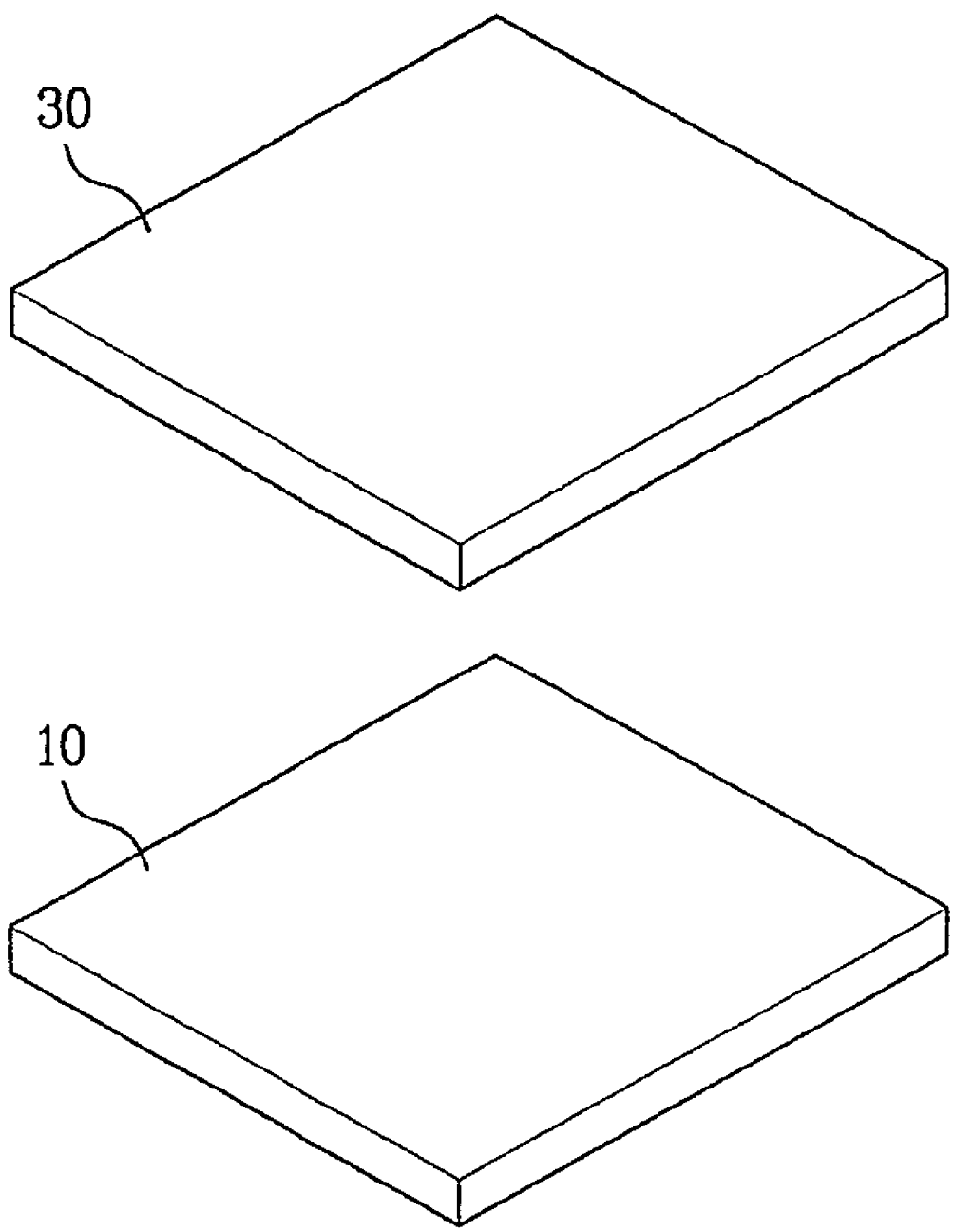
FIGS. 3A, 3B, and 3C are perspective views showing a process for manufacturing an LCD device according to another embodiment of the present invention.
Figure 3B:
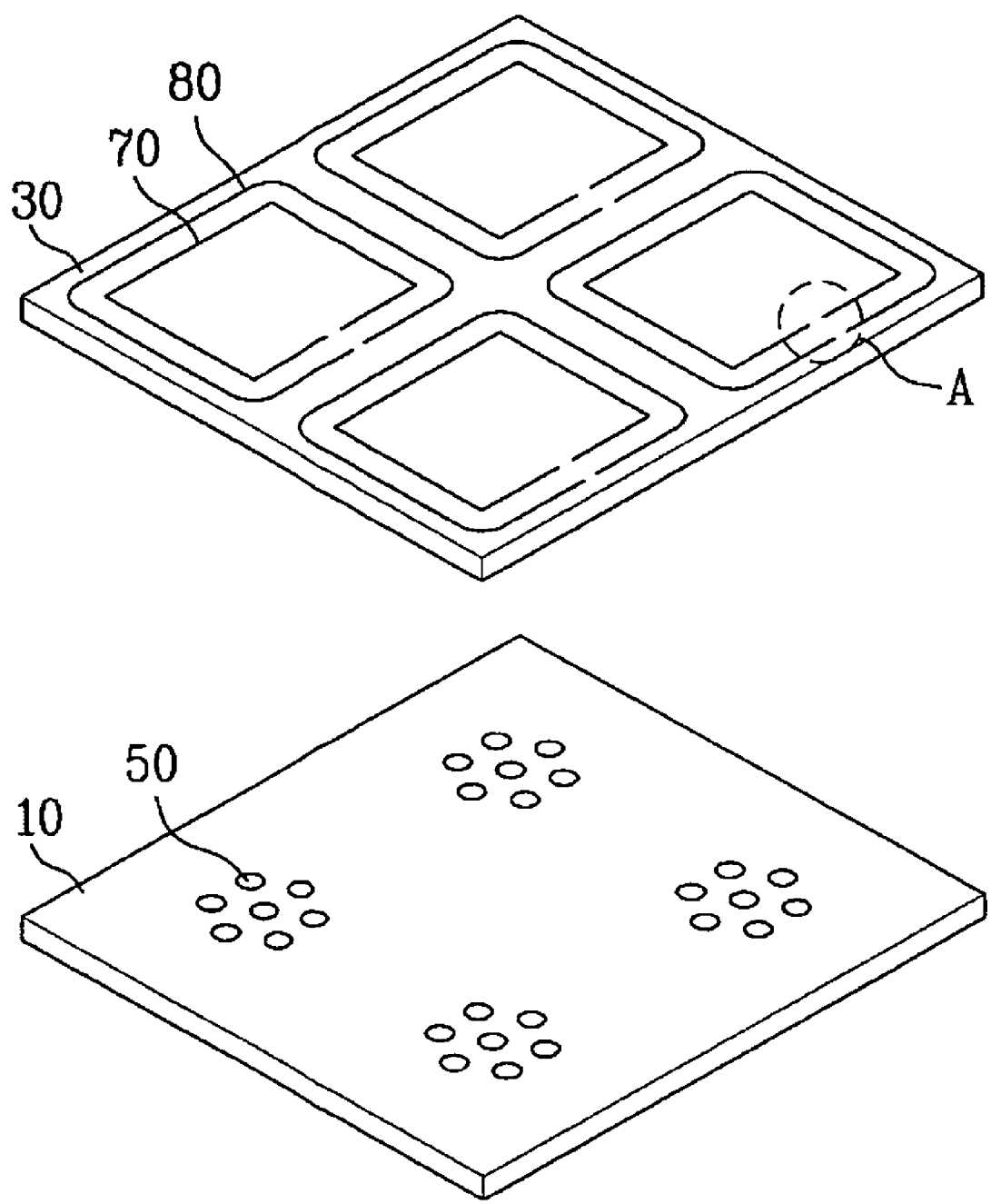
Figure 3C:
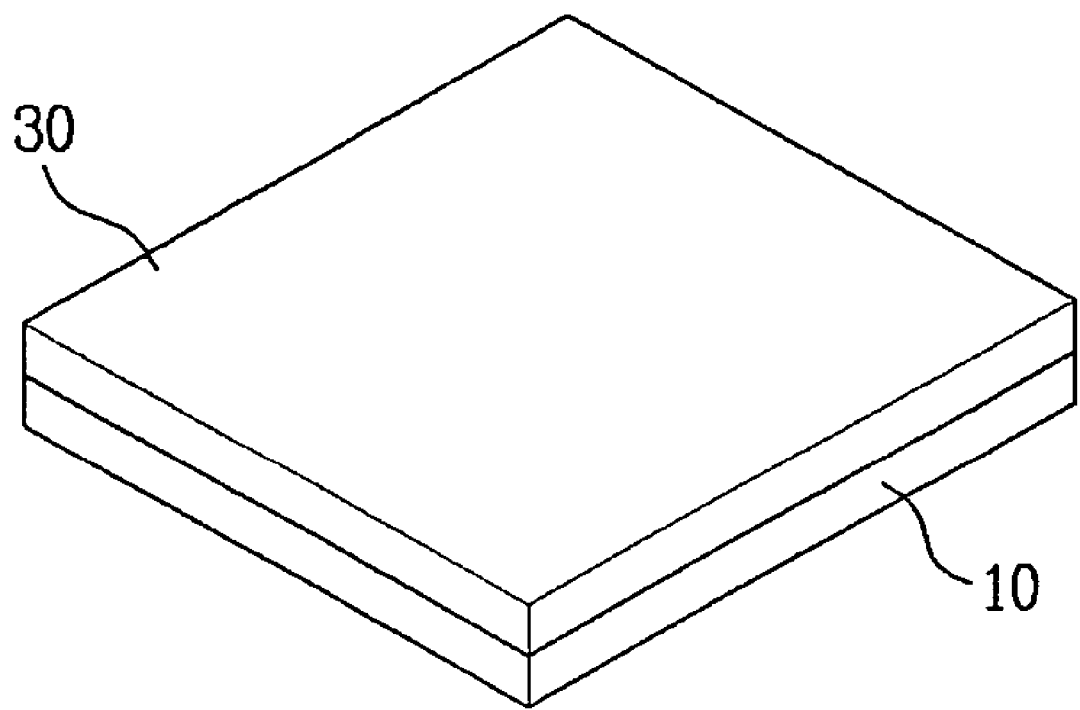

FIGS. 3A to 3C are perspective views showing a process for manufacturing an LCD device according to another embodiment of the present invention.

As shown in FIG. 3A, a lower substrate 10 and an upper substrate 30 are prepared.

Referring to FIG. 3B, liquid crystal 50 is dispensed on the lower substrate 10. Also, a main sealant 70 and an auxiliary sealant 80 are formed on the upper substrate 30 at the same time.

As shown in FIG. 3C, following the formation of the sealants on the upper substrate 30, an LCD device is formed by bonding the lower and upper substrates 10 and 30 to each other.

As shown in FIG. 3B, when forming the main sealant 70 and the auxiliary sealant 80, each of the sealants has a predetermined gap which is suitable for being connected under a pressure caused by the bonding process. With the exception of the formation of the predetermined gap, the method explained in FIGS. 3A to 3C is same as the method explained with reference to FIGS. 2A to 2C. Whereby the same reference numbers are used in FIGS. 3A to 3C, and the identical portions of the explanation are omitted.

As shown at "A" of FIG. 3B, when forming the main sealant 70 and the auxiliary sealant 80 on the upper substrate 30, each of the sealants 70 and 80 has the predetermined gap suitable for being connected with the pressure caused by the bonding process. That is, when bonding the two substrates 10 and 30 to each other by pressure, each of the sealants increases in length and the sealant is connected. Thus, each of the sealants 70 and 80 is formed in a shape of closed pattern after performing the bonding process.

Hereinafter, an apparatus for dispensing the sealant of an LCD device according to the present invention will be described with reference to the accompanying drawings.

Figure 4:
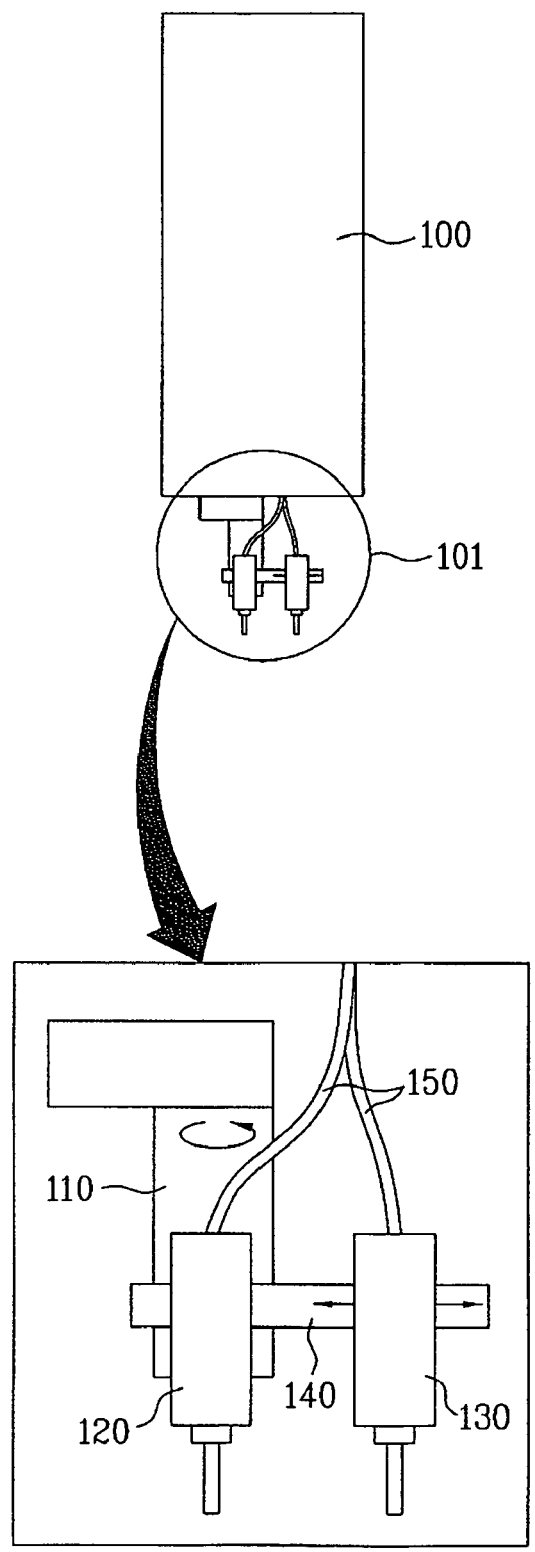
FIG. 4 is a cross sectional view showing an apparatus for dispensing the sealant of an LCD device according to an embodiment of the present invention.

FIG. 4 is a cross sectional view showing a sealant dispensing apparatus for an LCD device according to an embodiment of the present invention.

As shown in FIG. 4, the sealant dispensing apparatus comprises a syringe 100 and a nozzle 101. The nozzle 101 is connected with the syringe 100, wherein the nozzle 101 is provided with a rotation axis 110, a main nozzle 120, an auxiliary nozzle 130, a connection bar 140, and a pipe 150.

The syringe 100 holds the sealant. The syringe 100 is connected with the main nozzle 120 and the auxiliary nozzle 130 by the pipe 150. Accordingly, the sealant of the syringe 100 is transmitted to the main nozzle 120 and the auxiliary nozzle 130 through the pipe 150, and is then discharged outside of the syringe. The main nozzle 120 is provided for formation of the main sealant 70, and the auxiliary nozzle 130 is provided for formation of the auxiliary sealant 80.

The rotation axis 110 is connected to the connection bar 140, and the connection bar 140 is connected to the main and auxiliary nozzles 120 and 130.

The main nozzle 120 is provided opposite to the rotation axis 110 with the connection bar 140 interposed. The auxiliary nozzle 130 is provided at a predetermined interval from the rotation axis 110. As the rotation axis 110 rotates, the main nozzle 120 rotates on its own axis, and the auxiliary nozzle 130 revolves around the main nozzle 120. Thus, as explained in FIG. 2B, the main sealant 70 may be formed in shape of square, and the auxiliary sealant 80 may be formed in shape of square having four rounded corners. The main sealant 70 and the auxiliary sealant may have other enclosing shapes such as a rectangle or other polygon.

The auxiliary nozzle 130 is movable along the connection bar 140. Thus, it is possible to control the interval between the main nozzle 120 and the auxiliary nozzle 130. Accordingly, as shown in FIG. 2B, the interval between the main nozzle 120 and the auxiliary nozzle 130 is controlled within an appropriate range.

The sealant dispensing apparatus may additionally include a pattern sensor. The pattern sensor may include a CCD (Charged Coupled Device) camera. The pattern sensor checks whether the sealant has a disconnected portion or whether the sealant has the appropriate line width. One or two pattern sensors may be positioned on the course of the main and auxiliary nozzles 120 and 130.

Hereinafter, an LCD device manufactured by the sealant dispensing apparatus according to the present invention will be described as follows.

Figure 5A:
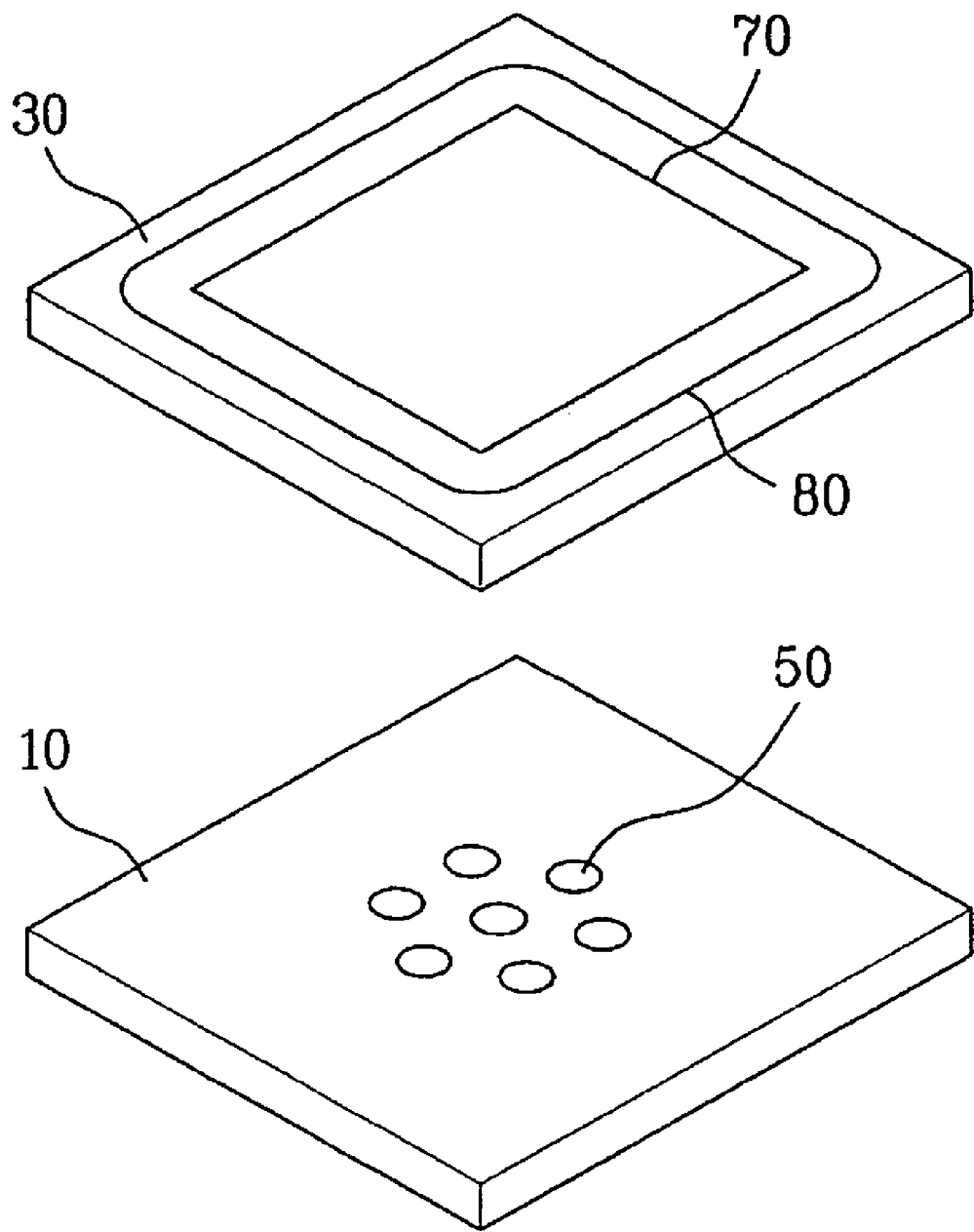
FIG. 5A is a perspective view showing an LCD device according to an embodiment of the present invention before performing a bonding process.
Figure 5B:
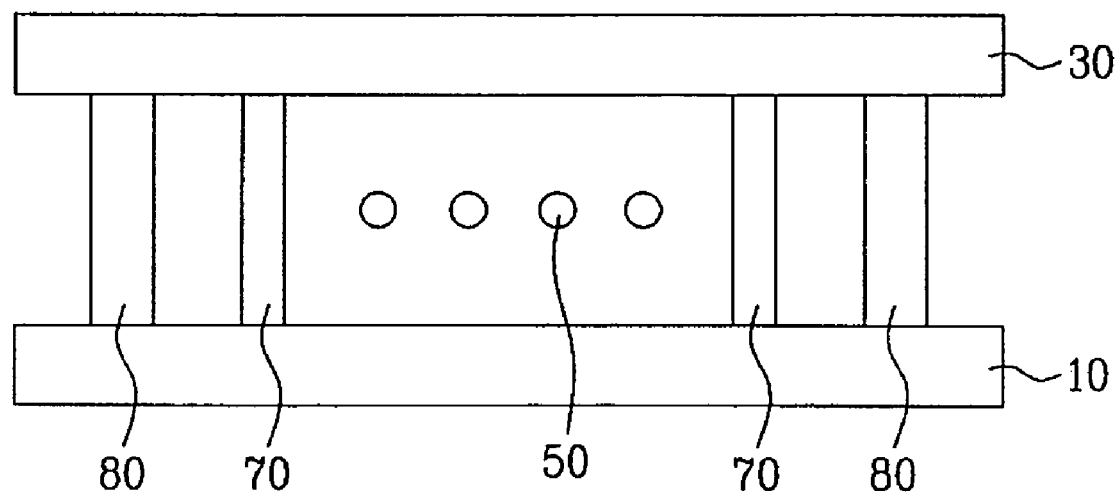
FIG. 5B is a cross sectional view showing an LCD device after performing a bonding process.

FIG. 5A is a perspective view showing an LCD device according to one embodiment of the present invention before performing a bonding process, and FIG. 5B is a cross sectional view showing an LCD device after performing a bonding process.

As shown in FIGS. 5A and 5B, the LCD device according to an embodiment of the present invention comprises a lower substrate 10, an upper substrate 30, a main sealant 70, an auxiliary sealant 80, and a liquid crystal layer 50. The main sealant 70 and the auxiliary sealant 80 are formed between the lower and upper substrates 10 and 30. The liquid crystal layer 50 is formed between the lower and upper substrates 10 and 30.

The lower and upper substrates have the same structure as those described above.

The main and auxiliary sealants 70 and 80 are formed with the previously described sealant dispensing apparatus. The main sealant 70 may be formed in shape of square. The auxiliary sealant 80 is provided in the periphery of the main sealant 70, with the periphery being an area surrounding the perimeter formed by the main sealant 70. The auxiliary sealant 80 may be formed in shape of square having four rounded corners. The auxiliary sealant 80 and the main sealant 70 may have other enclosing shapes.

Each of the main and auxiliary sealants 70 and 80 may have a predetermined gap. However, after performing the bonding process, each of the main and auxiliary sealants 70 and 80 is formed in the closed pattern.

The main and auxiliary sealants 70 and 80 may be formed of UV-hardening type sealants.

As mentioned above, the apparatus for dispensing sealant, the method of manufacturing the LCD device using the same, and the LCD device manufactured by the same according to the present invention have the following advantages.

The main and auxiliary sealants are formed by the a sealant dispensing apparatus in which the main and auxiliary nozzles are connected with one syringe and the auxiliary nozzle revolves around the main nozzle. Thus, the main and auxiliary sealants are formed at the same time, thereby decreasing the process time.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a liquid crystal display (LCD) device comprising:
   providing a first substrate;
   providing a second substrate;
   dispensing a liquid crystal on either the first or second substrate;
   forming a sealant pattern with a sealant on either the first or second substrate using a dispensing apparatus comprising: a syringe for holding a sealant; a main nozzle and an auxiliary nozzle connected to the syringe wherein the auxiliary nozzle is able to revolve around the main nozzle;
   bonding the first and second substrates; and
   curing the sealant;
   wherein the liquid crystal is uniformly filled between the first and second substrates and the liquid crystal substantially does not come into contact with the sealant before curing.

2. The method of claim 1, wherein forming a sealant pattern comprises:
   dispensing sealant using the main nozzle to form a main sealant having no inlet on any one of the lower and upper substrates;

dispensing sealant using the auxiliary nozzle to form an auxiliary sealant in the periphery of the main sealant on any one of the lower and upper substrates;

wherein the main and auxiliary sealants are formed at the same time.

3. The method of claim 2, wherein the auxiliary nozzle is movable for controlling an interval from the main nozzle.

4. The method of claim 2, wherein the dispensing apparatus further comprises:

a rotation axis; and a connection bar for connecting the rotation axis with the nozzles.

5. The method of claim 2, wherein forming an auxiliary sealant comprises revolving the auxiliary nozzle around the main nozzle to dispense sealant to form a rounded corner.

* * * * *